United States Patent [19]

Wehner

[11] Patent Number: 4,801,192
[45] Date of Patent: Jan. 31, 1989

[54] ELECTRIC AERIAL CABLE HAVING AN OPTICAL COMMUNICATIONS LINE

[75] Inventor: Roderich Wehner, Köln, Fed. Rep. of Germany

[73] Assignee: U.S. Philips Corp., New York, N.Y.

[21] Appl. No.: 71,694

[22] Filed: Jul. 9, 1987

[30] Foreign Application Priority Data

Jul. 18, 1986 [DE] Fed. Rep. of Germany ....... 3624267

[51] Int. Cl.⁴ ............................................. G02B 6/00
[52] U.S. Cl. ................................................... 350/96.23
[58] Field of Search ..................................... 350/96.23

[56] References Cited

U.S. PATENT DOCUMENTS

| Re. 32,293 | 11/1986 | Dey et al. | 350/96.23 |
| 4,514,058 | 4/1985 | Walton | 350/96.23 |
| 4,703,998 | 11/1987 | Uchioke et al. | 350/96.23 |

FOREIGN PATENT DOCUMENTS 2680682 9/1978 Japan.
2017968A 10/1979 United Kingdom.
204393A 10/1980 United Kingdom.

Primary Examiner—William L. Sikes
Assistant Examiner—Akm E. Ullah
Attorney, Agent, or Firm—Ernestine C. Bartlett

[57] ABSTRACT

The invention relates to an electric aerial cable having a cavity formed by electrically conductive sectional elements which are joined so as to form a tube, in which cavity an optical communications line is housed.

The watertightness of this cable is ensured also at higher temperatures in that the tangentially adjoining end faces of the sectional elements (1) have facing grooves (9) which extend in a longitudinal direction and which form an enclosed chamber in which an elastically compressed sealing element (8) is arranged.

6 Claims, 1 Drawing Sheet

ELECTRIC AERIAL CABLE HAVING AN OPTICAL COMMUNICATIONS LINE

FIELD OF THE INVENTION

The invention relates to an electric aerial cable having a cavity formed by electrically conductive sectional elements which are joined so as to form a tube, in which cavity an optical communications line is housed.

BACKGROUND OF THE INVENTION

An aerial cable of this type is known from FIG. 5 of DE-PS No. 28 20 510 which corresponds to U.S. Pat. No. Re. 32,293, a reissue of U.S. Pat. No. 4,359,598. To prevent the penetration of water the central cavity of this known aerial cable is filled with a fatty material. In particular at higher temperatures the fatty substance can escape through the joints between the sectional elements, consequently the watertight sealing can no longer be guaranteed.

SUMMARY OF THE INVENTION

It is an object of the invention to provide an aerial cable of the type mentioned in the opening paragraph which is watertight for a long period of time also at higher temperatures.

This object is achieved in that the tangentially adjoining end faces of the sectional elements have facing grooves which extend in a longitudinal direction, and which form an enclosed chamber in which an elastically compressed sealing element is arranged.

The material used for the sealing element must retain its elasticity even at the highest possible temperatures. During the manufacture of the aerial cable whose cavity is formed by the sectional elements the sealing elements can be inserted at the same time without appreciable additional expenditure. In a readily conceivable way the solution according to the invention provides a lasting, reliable seal against the penetration of water in the central cavity in which the communications line is housed. Moreover, if this cavity contains a gel-like substance, this substance cannot escape even at higher temperatures.

An advantageous embodiment is characterized in that the inside contour of the grooves is essentially rectangular and that of the sealing element is annular, the diameter in the unstressed condition being larger than the tangential inside diameter of the chamber housing the sealing element. In this embodiment the rectangular cross-section of the cavity provides sufficient room for the elastic deformation of the sealing element.

It is advantageous that the depth of the grooves is less than 0.4 times their width. Consequently, the seal is predominantly formed on the base areas of the grooves.

Satisfactory results for obtaining a lasting seal were obtained with grooves having a depth from 0.4 to 0.48 times the diameter of the sealing element. Even without employing further means to interengage the sectional elements, stable and smooth tubular bodies could be formed because the sectional elements were intertwisted with a length of lay of from 7 to 10 times the outside diameter of the tubular body which they form.

The invention will now be described in more detail by means of advantageous examples of embodiments and with reference to a drawing.

DETAILED DESCRIPTION OF THE PREFERRED EMBODIMENTS

Figure 1:
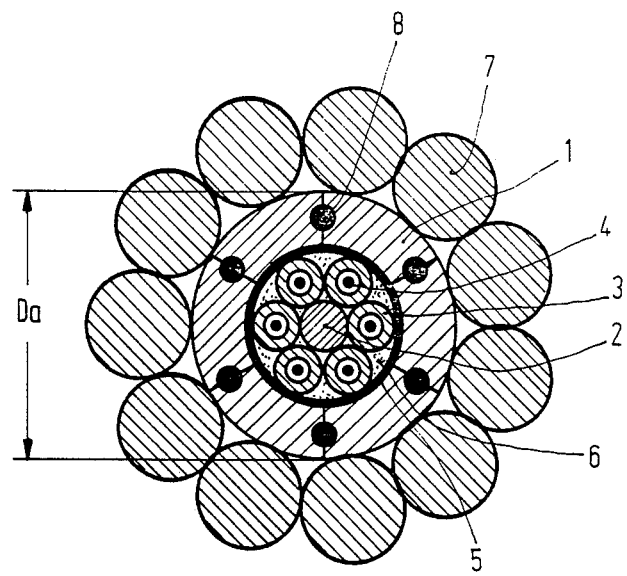
FIG. 1 is a cross-sectional view of an aerial cable according to the invention.

In FIG. 1 six sectional elements 1 form a central cavity in which an optical communications line is housed. Six air-space paper-insulated cores 3, each housing a slack optical fibre 4, are stranded around a strain-relief supporting body 2. An air-space paper-insulated core may of course house more optical fibres. The space between these cores 3, which is bounded by a sheath 5, is filled with a gel-like mass 6. A layer of electrically conductive round wires 7 is stranded around the tubular body, formed by the sectional elements 1.

The tangentially adjoining end faces of the sectional elements 1 have longitudinal grooves which form each others mirror image, these sectional elements together forming an enclosed chamber into which sealing elements 8 are introduced to obtain a seal, which elements lie, at least in a tangential direction, elastically tight against the sectional elements 1.

Figure 2:
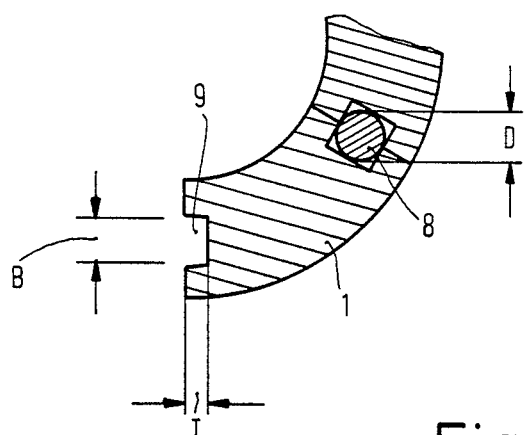
FIG. 2 is a cross-sectional view of a part of a preferred embodiment of an enclosed chamber for housing a sealing element.

A preferred embodiment of the grooves and of a sealing element is shown in FIG. 2. In this embodiment the grooves 9 have a substantially rectangular cross-section with a depth T which is 0.45 times the diameter D of the sealing element 8, such that after its incorporation the sealing element 8 is compressed in a tangential direction down to 0.9 times its original diameter. Since the width B is 1.3 times the diameter D the sealing material 8 has room for radial deformation in particular, its cross-section taking the form of an ellipse.

Suitable values of the depth T and the width B of the groove 9 do not only depend upon the diameter D of the sealing element 8 but also upon its specific material characteristics such as, in particular, its modules of elasticity.

Particularly suitable materials which retain their elasticity also at higher temperatures of 160° are silicone, polyacrylates or fluoropolymers such as Viton. The sectional elements 1 were stranded with a length of lay from 7 to 10 times the outside diameter Da of the tubular body which they form. In this stranding process which from the point of view of manufacturing is suitable for obtaining closely stranded sectional elements, a satisfactory interengagement of the sectional elements is obtained, and hence, a smooth surface. The sealing elements 8 are stranded in the same stranding process.

What is claimed is:

1. A water-tight electric aerial cable having a cavity formed by a plurality of electrically conductive sectional elements which are joined so as to form a tube, in which cavity an optical communications line is housed, wherein the tangentially adjoining end faces of the sectional elements are interengaged and have longitudinal facing grooves with a substantially rectangular inside contour which form an enclosed chamber in which an elastically compressed annular sealing element is arranged, said sealing element retaining its elasticity at high temperatures and having a diameter which in the uncompressed condition is larger than the tangential inside diameter of the chamber.

2. An aerial cable as claimed in claim 1, wherein the depth of the grooves is less than 0.4 times their width.

3. An aerial cable as claimed in claim 2, wherein the depth of the grooves is from 0.4 to 0.48 times the diameter of the sealing element.

4. An aerial cable as claimed in claim 1, wherein the sectional elements are intertwisted with a length of lay of from 7 to 10 times the outside diameter of the tubular body which they form.

5. An electric aerial cable comprising a plurality of cores surrounded by a sheath, each core housing an optical fiber and stranded around a supporting body, the spaces between the cores being filled with a gel-like mass; a plurality of electrically conductive sectional elements surrounding said sheath to form a tubular body; and a layer of electrically conductive wires stranded around the tubular body; wherein the tangentially adjoining end faces of the sectional elements are interengaged and have longitudinal facing grooves with a substantially rectangular inside contour which form an enclosed chamber in which an elastically compressed annular sealing element is arranged, said sealing element retaining its elasticity at high temperatures and having a diameter which in the uncompressed condition is larger than the tangential inside diameter of the chamber.

6. An electrical aerial cable as claimed in claim 5 wherein the sectional elements are intertwisted with a length of lay of from 7 to 10 times the outside diameter of the tubular body which they form.

* * * * *